UNITED STATES PATENT OFFICE.

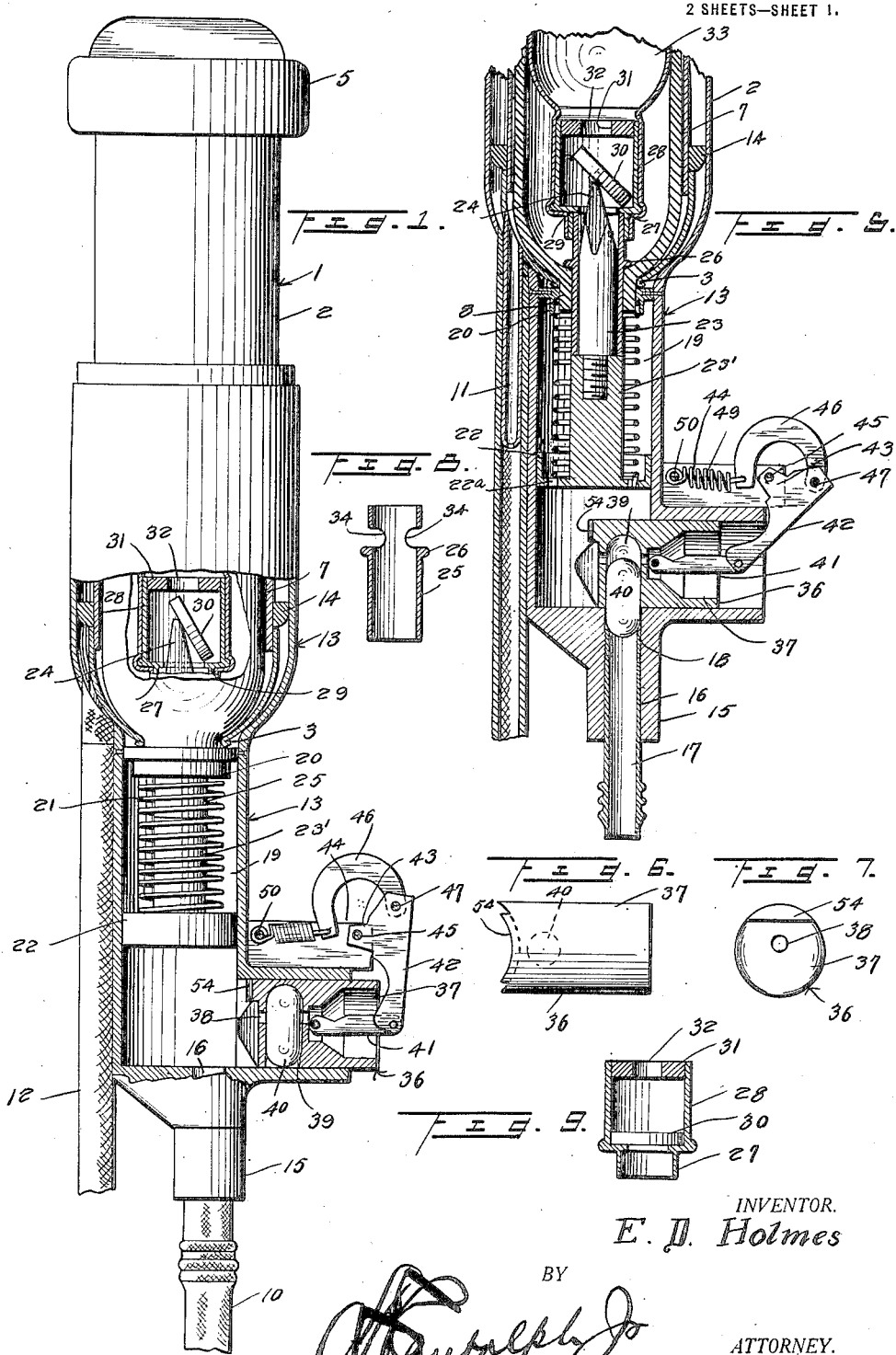

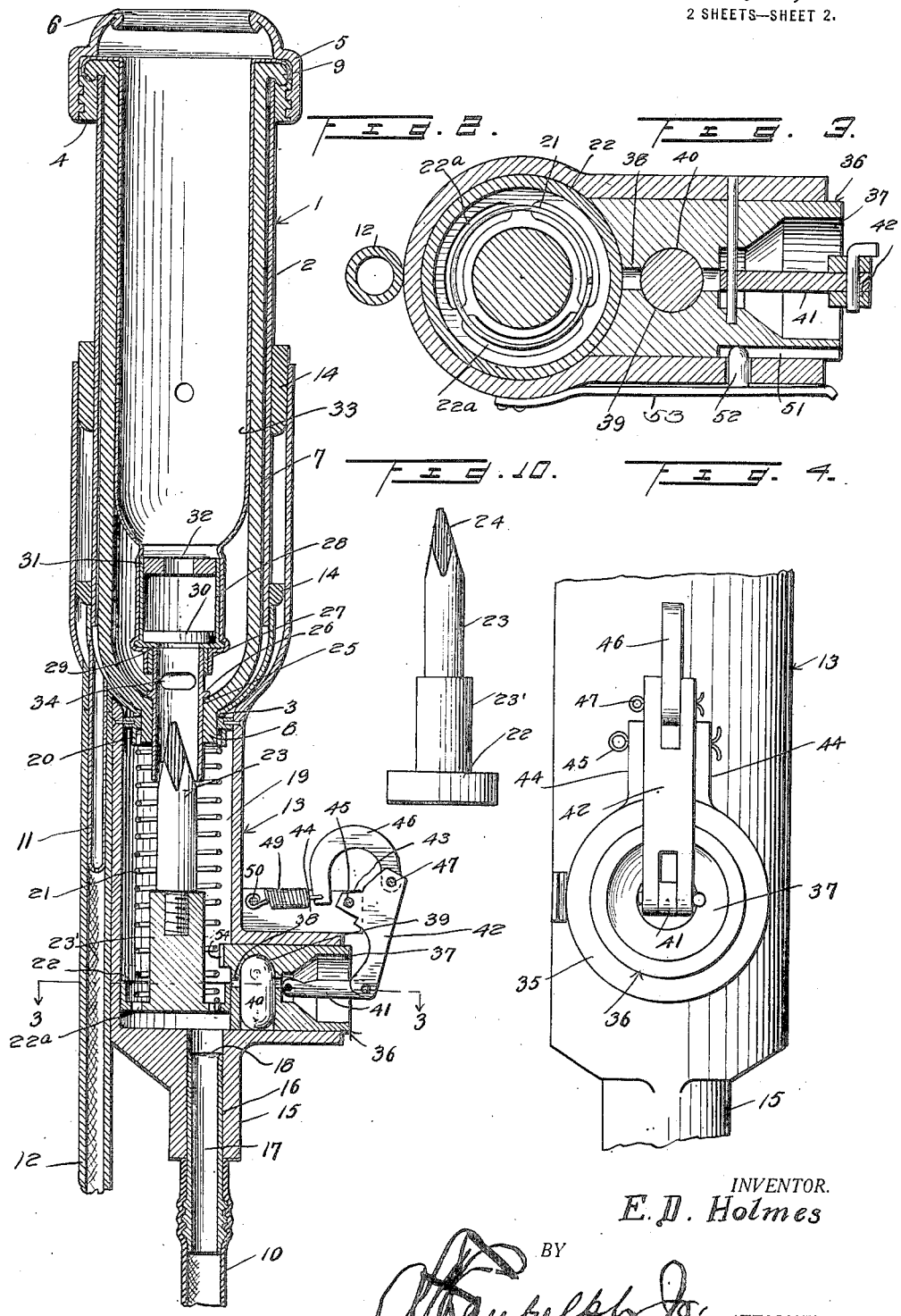

ERNEST D. HOLMES, OF ATHENS, GEORGIA.

AUTOMATIC STOP FOR MILKING-MACHINES.

1,385,049.　　　　　　　Specification of Letters Patent.　　Patented July 19, 1921.

Application filed July 23, 1920. Serial No. 398,335.

*To all whom it may concern:*

Be it known that I, ERNEST D. HOLMES, a citizen of the United States, residing at Athens, in the county of Clarke and State of Georgia, have invented certain new and useful Improvements in Automatic Stops for Milking-Machines; and I do hereby declare the following to be a full, clear, and exact description of the invention, such as will enable others skilled in the art to which it appertains to make and use the same.

This invention relates to new and useful improvements in automatic stops for milking machines and has for its primary object the provision of means adapted to automatically release the teat cup from a cow's teat on exhaustion of the milk so as to prevent injury to the cow caused by overmilking and also obviates manual attention as now required when using milking machines.

Another object of this invention is the provision of a device that is adapted to operate in conjunction with any well known teat cup of the type employing a vacuum and which is adapted to automatically destroy the vacuum in the cup on exhaustion of the milk so that said cup will fall or become disengaged from the teat, thereby discontinuing the milking operation on said teat.

A further object of this invention is the provision of an automatic stop which may be easily and quickly installed to operate with a teat cup and which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation partly in section illustrating an automatic stop for milking machines constructed in accordance with my invention, Fig. 2 is a vertical sectional view illustrating the same, Fig. 3 is a transverse sectional view taken on the line 3—3 of Fig. 2, Fig. 4 is a fragmentary side elevation taken at right angles to Fig. 1, Fig. 5 is a fragmentary vertical sectional view illustrating the position of the various parts when the device acts to detach the teat cup from the cow's teat, Fig. 6 is a detail view illustrating a combined valve and catch, Fig. 7 is an end elevation illustrating the same, Fig. 8 is a detail sectional view illustrating a plunger tube, Fig. 9 is a detail sectional view illustrating a valve chamber, Fig. 10 is a side elevation illustrating the plunger.

Referring in detail to the drawings, the numeral 1 indicates an ordinary teat cup consisting of a cylindrical casing 2 having its lower end reduced to form a neck 3 and has its upper end open and provided with a screw threaded shoulder 4 for the reception of a retaining cap 5. The cap 5 is threaded on the shoulder 4 and is provided with a teat receiving opening 6. A teat nipple 7 is located within the casing 2 and has its lower end reduced to form a neck 8 adapted to project through the neck 3 of the casing, while the upper end of the nipple 7 is provided with an annular flange 9 adapted to be clamped between the upper end of the casing 2 and the cap 5, so as to retain said nipple in place. The teat nipple 7 is constructed from rubber or any other material suitable for the purpose and the foregoing description relates to a well known construction of teat cup and which is usually connected to a vacuum hose 10 by having said hose applied to the neck 3, so as to extract the milk from a cow's teat by suction created by a vacuum in the hose 10. Also the casing 2 may be provided with a tube 11 having communication with the interior of the casing and with a pressure hose 12 so as to place pressure on the teat nipple 7 so as to further extract milk from the teat by a squeezing operation. When using the teat cup 1 in the ordinary manner, it is necessary for the operator to at all times observe the milking operation so as to prevent overmilking of the cow or a continuation of the milking operation after the milk has become exhausted and if the device is not removed after the exhaustion of the milk will cause injury to the cow. To prevent overmilking and injury to the cow, I have provided an automatic stop which is adapted to automatically release the teat cup 1 from the cow's teat when the milk becomes exhausted, and consists of a casing 13 having its upper portion enlarged and shaped to receive the lower portion of the casing 2. Packing washers 14 are secured to the teat cup or casing 2 thereof and have frictional contact with the casing 13 so as to establish an air tight connection between the casing 13 and the teat cup. The lower end of the casing 3 is provided with a neck 15 having a passage 16 and in which is located a tube 17. The tube 17 extends outwardly of the passage 16 for connection with the vacuum hose 10 and has its inner end beveled to form a valve seat 18. The casing 13 in its medial portion is provided with a chamber 19 that communicates with the passage 16 and also receives the neck 3 of the casing 2 and the neck 8 of the teat nipple 7. An annular member 20 is detachably secured in the casing 13 and surrounds the neck 8 of the teat nipple 7 and has secured thereto a contractile spring 21 which is connected to the head 22 of a plunger 23'. The plunger 23' is mounted for reciprocation within the chamber 19 and the head 22 is provided with a plurality of apertures 22a for permitting milk and air to readily pass through said head during the operation of the device. The plunger 23' has detachably secured thereto a combined valve and stem 23, the upper or free end of which is provided with beveled faces 24 and which faces also reduce said end of the stem to a considerable degree. The reduced end of the stem 23 is received within a tube 25 which projects upwardly in the teat nipple 7 by way of the neck 8 and has formed thereon an annular rib 26 adapted to contact with the neck 8 so as to form a firm connection between the neck 8 and the tube. The upper end of the tube is received in a sleeve 27 formed on the lower end of a valve chamber 28. The valve chamber 28 is located within the teat nipple 7 and is provided with a valve seat 29 engaged by a check valve 30. The check valve 30 is limited in its upward movement by means of a stop 31 which has a passage 32 therethrough. A milk bag 33 is located within the teat nipple and is adapted to surround the teat when the cup 1 is applied thereto and has its upper end clamped between the flange 9 and the cap 5 and has its lower end detachably secured to the valve casing 28. The milk bag 33 is provided with a series of openings therein so that the interior of said bag will have communication with the interior of the teat nipple 7. The spring 21 is of the contractile type so as to normally urge the head 22 upwardly positioning the reduced end of the stem 23 within the valve chamber 28 and thereby maintain the valve 30 in an open position as illustrated in Fig. 5. When the stem 23 is in the last named position only a very small space exists between said stem and the tube 25 and of such a size that air may pass through said tube but will prevent the passage of milk therethrough until the plunger 23' has moved downwardly. The tube 25 above the bead 26 is provided with a series of openings 34 to permit milk to escape from the valve chamber 30 into the lower end of the teat nipple 7 when the stem 23' is in one of its positions and to permit the milk to drain from said teat nipple when the stem is in another position. A horizontally disposed auxiliary housing 35 is formed on the casing 13 and has communication with the chamber 19 and has slidably mounted therein a combined valve and catch 36 consisting of a body 37 which has a vent passage 38 extending therethrough and said passage is in communication with a valve chamber 39 in which is slidably mounted a valve 40 and said valve normally closes the vent passage 38 by being in contact with the auxiliary housing 35. A link 41 is pivoted to the body 37 and to a lever 42. The lever 42 has formed adjacent one end an ear 43 which is pivoted to a bracket 44 as shown at 45. The bracket 44 is formed on the housing 35 and the casing 13. A U-shaped link 46 is pivoted to the short end of the lever 42 at one of its ends as shown at 47 and has its other end connected to a contractile spring 49 which is in turn secured to the bracket 44 as shown at 50. One portion of the lever 42 is cut away so as to permit the lever to follow the link 41 into the housing 35 when said combined catch and valve is in its innermost position and as shown in Fig. 5. The body 37 has formed therein a groove 51 which receives a pin 52 formed on a leaf spring 53. The leaf spring 53 is secured to the casing 13 and the pin 52 extends through an opening in the housing 35, and into the groove 51 for the purpose of limiting the inward and outward movement of the combined valve and catch 36. The leaf spring 53 provides a construction which will permit the pin 52 to be disengaged from the groove 51 when it is desired to remove the combined valve and catch from the housing 35.

The inner end of the body 37 has formed thereon a shoulder 54 adapted to engage the head 22 for locking the plunger 23' against upward movement when said body is in one of its positions and when said body is in its innermost position, the valve 36 may enter the passage 16 and engage the seat 18 to cut off the vacuum to the chamber 19 and permit the teat nipple 7 to come under atmospheric pressure. The inner end of the body 37 is recessed or curved to conform to the contour of the head 22 when the shoulder 54 overlies said head.

In operation, the cup is applied to the teat with the plunger 23' and its stem 23 in raised position, the valve 30 held open by the stem 23 and the combined catch and valve 36 held in retracted position by the spring 49 as shown in Fig. 5. As the diameter of the plunger stem 23 is smaller than the internal diameter of the tube 25, and as the plunger 23' is provided with a head having openings 22ª, there is, when the parts are in the position stated, direct communication between the teat nipple 7 and the tube 10 which has connection with the pulsator of a well known form of milking apparatus. Consequently, the action of the pulsator brings about a reduction of the atmospheric pressure in the teat nipple 7 resulting in the drawing of a stream of milk into valve chamber 28 sufficient to seal the air passage between the plunger stem 23 and the tube 25. As soon as this takes place, the action of the pulsator brings about a reduction of air pressure below the plunger 23' to a degree less than that above the plunger stem 23 and as a consequence the plunger and the stem are moved downwardly against the tension of the retractile spring 21. This movement of the plunger and its stem permits the valve 30 to seat and the faces 22 of the stem 23' are then below the tube 25 so that the milk in said tube may drain therefrom and the milk which is being extracted from the teat to accumulate in the valve chamber 28 and milk bag 33. If the milk accumulates within the bag to such an extent that it will come in close proximity to the end of the teat, the same will pass out of the milk bag into the nipple 7 by way of the openings in the milk bag. Up to this time the combined catch and valve 36 is held against inward movement by the application of thumb pressure to the lever 42 at a point above its pivot 45 and also the cup 1 is manually held on the teat and by the end of several pulsations of the pulsator, the reduction of air pressure in the nipple 7 is sufficient to hold the cup to the teat and the lever 42 is released. When the pulsator increases the atmospheric pressure in the chamber 19 the plunger moves upwardly by the spring 21 and unseats the valve 30 and permits the milk heretofore extracted from the teat to seek its level in the lower end of the nipple 7 so that on reduction of the atmospheric pressure by the pulsator in the chamber 19, the plunger again moves down rapidly and the combined valve and catch 36 later moves inwardly to engage the head 22 of the plunger and hold the same downwardly. It requires a greater reduction of atmospheric pressure in the chamber 19 to allow the combined valve and catch to move inwardly than that required by the plunger as the spring 49 is stronger than the spring 21. With the plunger down, the milk collected in the nipple 7 and tube 28 drains through the casing 13 into the tube 10 where it is collected in the usual manner. As soon as the atmospheric pressure begins to increase the second time, the spring draws the combined valve and check outwardly and frees the plunger which will move up by the spring 21 when the atmospheric pressure reaches its highest degree so as to unseat the valve 30 and permit the milk to pass into the nipple 7. The operation of the various parts are as above stated continued until the exhaustion of the milk in the teat. Just before the exhaustion of the milk in the teat, there is usually a few drops left sufficient to close the passage between the plunger stem and the tube 25 and on the plunger being again moved downwardly, it is held down so that all the milk is removed from the tube 25 leaving the air passage between the plunger stem and the tube 25 unsealed when the plunger returns to its uppermost position, so that when the atmospheric pressure in the chamber 19 is again reduced the plunger remains up. The combined catch valve 36 then moves inwardly to a position shown in Fig. 5 and the valve 40 engages the seat 18 preventing any further reduction of the atmospheric pressure in the chamber 19 and also the vent passage 38 is opened and allows the chamber 19 and nipple 7 to come under normal atmospheric pressure which frees the cup from the teat, thus it will be noted that the device will prevent overmilking of the teat and also will allow a cow's udder to be entirely exhausted of milk.

Most cows deliver more milk in some teats than in others, and with my invention in use on each teat, the first teat to be exhausted of milk will be relieved of the milking operation while the other teats still receive the milking operation until they are exhausted of milk and then they are automatically freed from the milking operation.

When the device is in a position as shown in Fig. 5, and it is desired to reset or apply the same to a teat of another cow, the device is inverted so that the plunger or valve 40 slides up into the chamber 39 and the operator presses upon the shortest end of the lever 42 to move the combined valve and catch 36 to its outermost position.

While I have shown and described the preferred embodiment of my invention, it will be understood that minor changes in construction, combination, and arrangement of parts may be made without departing from the spirit and scope of the invention as claimed.

Having thus described my invention what I claim is:—

1. In combination, a teat cup held to a teat by having the air displaced therein and a vacuum tube, a casing connecting the tube and cup and having the air pressure therein decreased and increased at intervals and at a pressure below atmospheric pressure, a milk receiving means in the cup and having communication with the casing, a valve in said means, means reciprocated by the increase and decrease of air pressure for opening and closing the valve, and means adapted to admit atmospheric pressure to the casing and cup on the exhaustion of milk from the teat.

2. In combination, a teat cup held to a teat by having the air displaced therein and a vacuum tube, a casing connected to the tube and cup, and having the air pressure therein decreased and increased and at a pressure below atmospheric pressure, a milk receiving means in the cup and extending into the casing, a valve in said means, means mounted for reciprocation in the casing and the first means to unseat and seat the valve, said last means being reciprocated by the increase and decrease of air pressure, and means adapted to admit atmospheric pressure to the casing and cup on the exhaustion of milk from the teat.

3. In combination, a teat cup held to a teat by having the air displaced therein and a vacuum tube, a casing connected to the tube and cup and having the air pressure therein decreased and increased and at a pressure below atmospheric pressure, a milk receiving bag in the cup, a valve for the milk receiving bag and having communication with the casing, means mounted for reciprocation in the casing and adapted to unseat and seat the valve, said last means being reciprocated by the increase and decrease of air pressure, and means adapted to admit atmospheric pressure to the casing and cup on the exhaustion of milk from the teat.

4. In combination, a teat cup held to a teat by having the air displaced therein and a vacuum tube, a casing connected to the tube and cup and having the air pressure therein decreased and increased and at a pressure below atmospheric pressure, milk receiving means in the cup, a valve chamber connected to said means, a valve in said chamber, means mounted for reciprocation in the casing and adapted to unseat and seat the valve, said last means being reciprocated by the increase and decrease of air pressure, and means adapted to admit atmospheric pressure to the casing and cup on the exhaustion of milk from the teat.

5. In combination, a teat cup held to a teat by having the air displaced therein and a vacuum tube, casing connected to the tube and cup and having the air pressure therein decreased and increased and at a pressure below atmospheric pressure, an elastic milk receiving bag secured in said cup and adapted to receive the teat, a valve chamber connected to said bag, a valve in said chamber, means mounted for reciprocation in the casing and adapted to unseat and seat the valve, said last named means being reciprocated by the increase and decrease of air pressure, and means adapted to admit atmospheric pressure to the casing and cup on the exhaustion of milk from the teat.

6. In combination, a teat cup held to a teat by having the air displaced therein, and a vacuum tube, a casing connected to the tube and cup and having the air pressure therein increased and decreased at a pressure below atmospheric pressure, a milk receiving bag in the cup, a valve chamber secured to the bag, a gravity actuated valve in said chamber, a tube connected to the chamber and extending into the casing and having communication with the cup, means mounted for reciprocation in the casing and tube and adapted to unseat and seat the valve, said means being reciprocated by the increase and decrease of air pressure in the casing, and means adapted to admit atmospheric pressure to the casing and cup on the exhaustion of milk from the teat.

7. In combination, a teat cup held to a teat by having the air displaced therein and a vacuum tube, a casing connected to the tube and cup and having the air pressure therein decreased and increased and at a pressure below atmospheric pressure, milk receiving means in said cup, a valve chamber connected to said means, a valve in said chamber, a tube connected to the valve chamber and having communication with the cup, a plunger reciprocally mounted in the casing and tube and adapted to unseat and seat the valve and be reciprocated by the increase and decrease of air pressure, and means adapted to admit atmospheric pressure to the casing and cup on the exhaustion of milk from the teat.

8. In combination, a teat cup held to a teat by having the air displaced therein and a vacuum tube, a casing connected to the tube and cup and having the air pressure therein decreased and increased at a pressure below atmospheric pressure, milk receiving means in the cup, a valve chamber connected to said means, a tube connected to the valve chamber, a valve in said valve chamber, a plunger reciprocally mounted in the casing and tube and its external diameter being slightly smaller than the internal diameter of the tube to form an air passage, said air passage adapted to be sealed by milk in the tube during the reciprocation of the plunger, and means adapted to admit atmospheric pressure to the casing and cup on the exhaustion of milk from the teat.

9. In combination, a teat cup held to a teat by having the air displaced therein and a vacuum tube, a casing connecting the tube and cup and having the air pressure therein decreased and increased and at a pressure below atmospheric pressure, a milk receiving means in the cup, a valve chamber connected to said means, a valve in said chamber, a tube connected to the valve chamber and having openings establishing a communication between the interior of said tube and the cup to permit milk to flow from said means into the cup when the valve is unseated, a pressure reciprocating plunger mounted in the casing and tube and of a diameter slightly less than the internal diameter of the tube to form an air passage, means normally urging the plunger upwardly to unseat the valve, and means adapted to admit atmospheric pressure to the casing and cup on the exhaustion of milk from the teat.

10. In combination, a teat cup held to a teat by having the air displaced therein, and a vacuum tube, a casing connected to the tube and cup and having the air pressure therein decreased and increased and at a pressure below atmospheric pressure, a milk receiving means in the cup, a valve chamber connected to said means, a tube connected to the valve chamber and having communication with the cup, a valve in said chamber, a pressure reciprocated plunger mounted in the casing and tube and of a diameter slightly less than the internal diameter of the tube to form an air passage, said air passage adapted to be sealed by milk in the tube when the plunger is in its uppermost position, said plunger having its upper end reduced and provided with flattened faces adapted to permit milk to escape from the tube when the plunger is in its lowermost position, means connected to the plunger for normally holding the same upwardly to unseat the valve, and means adapted to admit atmospheric pressure to the casing and cup on the exhaustion of milk from the teat.

11. In combination, a teat cup held to a teat by having the air displaced therein and a vacuum tube, a casing connected to the tube and cup and having the air pressure therein decreased and increased and at a pressure below atmospheric pressure, a valve chamber connected to said cup, a valve in said chamber, a tube connected to the valve chamber and extending into the casing and having openings in communication with the cup, a plunger reciprocally mounted in the casing and tube, a spring connected to the plunger and casing for normally urging the plunger upwardly to unseat the valve, said plunger adapted to be moved downwardly by the decrease of air pressure in the casing, and means adapted to admit atmospheric pressure to the casing and cup on the exhaustion of milk from the teat.

12. In combination, a teat cup held to a teat by having the air displaced therein and a vacuum tube, a casing connected to the tube and cup and having the air pressure therein decreased and increased and at a pressure below atmospheric pressure, milk receiving means in the cup, a valve chamber connected to said means, a tube connected to the chamber, a valve in said chamber, a plunger reciprocally mounted in the casing and tube, a perforated head formed on the lower end of the plunger, a spring connected to the casing and head for normally urging the plunger upwardly to unseat the valve, and means adapted to admit atmospheric pressure to the casing and cup on the exhaustion of milk from the teat.

13. In combination, a teat cup held to a teat by having the air displaced therein and a vacuum tube, a casing connected to the tube and cup and having the air pressure therein decreased and increased and at a pressure below atmospheric pressure, a milk receiving means in the cup, a valve between said means and the cup, a tube connected to said means, a plunger reciprocally mounted in the casing and tube, a perforated head formed on said plunger, tension means connected to the head and casing for urging the plunger upwardly to unseat the valve, said plunger having its upper end reduced and flattened to permit the escape of milk from the tube when the plunger is in its lowermost position, and a combined catch and valve adapted to hold the plunger downwardly on the decrease of air pressure in the casing and adapted to free the plunger on the increase of air pressure in the casing, said combined catch and valve adapted to admit atmospheric pressure to the casing and cup on the exhaustion of milk from the teat.

14. In combination, a teat cup held to a teat by vacuum and a vacuum tube, a casing connecting the cup and tube and having the air pressure therein decreased and increased and at a pressure below atmospheric pressure, a milk receiving means in the casing and connected to the cup, a valve in said means, a valve actuating means in said casing, a member carried by the casing and moved in one direction by atmospheric pressure and limited in its movement by said valve actuating means, means for moving said member in an opposite direction, and means carried by said member for admitting atmospheric pressure to the casing on discontinuance of the operation of said valve actuating means for releasing the cup from the teat.

15. In combination, a teat cup held to a teat by a vacuum and a vacuum tube, a casing connecting the tube and cup and having the air pressure therein decreased and increased and at a pressure below atmospheric pressure, a milk receiving means in the casing, a valve for said means, a valve actuating means in said casing, a housing having communication with the casing, a member closing said housing and slidable therein and moved in one direction by atmospheric pressure, means for operating the member in an opposite direction, and means carried by said member to admit atmospheric pressure to the casing on the member moving into said casing for releasing the cup from the teat.

16. In combination, a teat cup held to a teat by a vacuum and a vacuum tube, a casing connecting the tube and cup and having the air pressure therein decreased and increased and at a pressure below atmospheric pressure, a milk receiving means in said casing, a valve for said means, a valve actuating means in said casing, a housing having communication with the casing, a member slidable in said housing and having a vent opening and moved toward the casing by atmospheric pressure and limited in said movement by the valve actuating means during the latter operation and adapted to move within the casing on discontinuance of the operation of said valve actuating means, means closing the vent opening by contacting with the housing, and means operating the member in an opposite direction.

17. In combination, a teat cup held to a teat by a vacuum and a vacuum tube, a casing connecting the tube and cup and having the air pressure therein decreased and increased and at a pressure below atmospheric pressure, a milk receiving means in the casing, a valve for said means, a valve actuating means in said casing, a housing having communication with the casing, a member slidable in said housing and having a vent opening and moved toward the casing by atmospheric pressure and limited in said movement by the valve actuating means during its operation and adapted to move within the casing on discontinuance of the operation of said valve actuating means, a plug closing said vent opening and contacting with the housing and adapted to close the tube and open the vent opening on said member moving into the casing, and means for operating the member in an opposite direction.

18. In combination, a teat cup held to a teat by a vacuum, and a vacuum tube, a casing connecting the tube and cup and having the air pressure therein decreased and increased and at a pressure below atmospheric pressure, a milk receiving means in the casing, a valve for said means, a valve actuating means in said casing, a housing having communication with the casing, a member slidable in said housing and having a vent opening and moved toward the casing by atmospheric pressure and limited in said movement by the valve actuating means during its operation and adapted to move within the casing on discontinuance of the operation of said valve actuating means, means for operating the member in an opposite direction, and means for opening and closing the vent opening at certain positions of the member.

19. In combination, a teat cup held to a teat by a vacuum and a vacuum tube, a casing connecting the tube and cup and having the air pressure therein decreased and increased and at a pressure below atmospheric pressure, a milk receiving means in the casing, a valve for said means, a valve actuating means in said casing, a housing having communication with the casing, a member slidable in said housing and having a vent opening and moved toward the casing by atmospheric pressure, means controlling the vent opening, a lever pivoted to the housing and connected to said member, tension means connected to said lever for moving the member in an opposite direction.

20. In combination, a teat cup held to a teat by a vacuum and a vacuum tube, a casing connecting the tube and cup and having the air pressure therein decreased and increased and at a pressure below atmospheric pressure, a milk receiving means in the casing, a valve for said means, a valve actuating means in said casing, a housing having communication with the casing, a member slidable in said housing and having a vent opening and moved toward the casing by atmospheric pressure, a lever pivoted to the housing adjacent one of its ends and having its longest end connected to said member, a U-shaped link pivoted to the short end of the lever, a tension means connected to said link, and means for opening and closing the vent opening at certain positions of said member.

In testimony whereof I affix my signature in presence of two witnesses.

ERNEST D. HOLMES.

Witnesses:
BENNETT S. JONES,
WM. F. DAVIDSON.